Aug. 30, 1955  R. V. LACKNER  2,716,688
SHEET LEVELING APPARATUS
Filed June 2, 1953  2 Sheets-Sheet 1

INVENTOR
ROBERT V. LACKNER
by Christy, Parmelee and Strickland
his attorneys

Aug. 30, 1955  R. V. LACKNER  2,716,688
SHEET LEVELING APPARATUS
Filed June 2, 1953  2 Sheets-Sheet 2
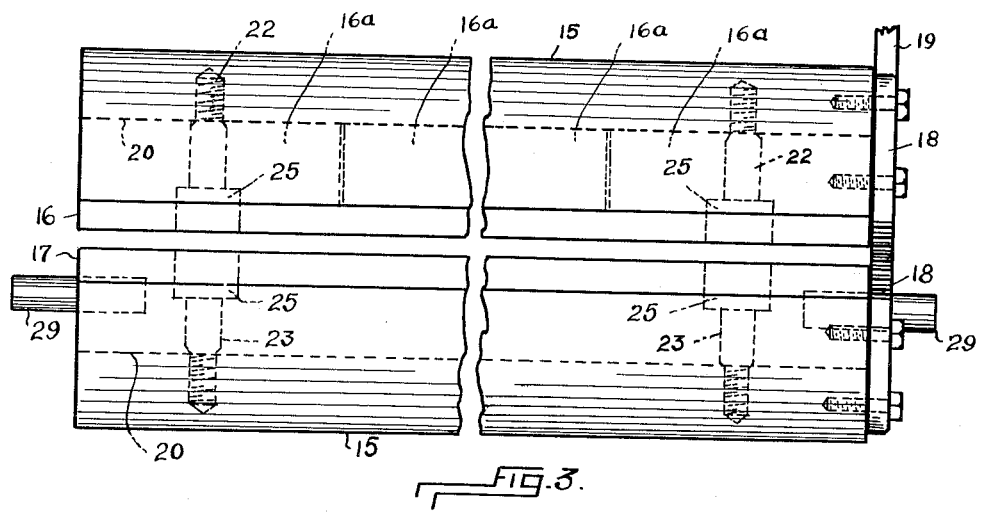
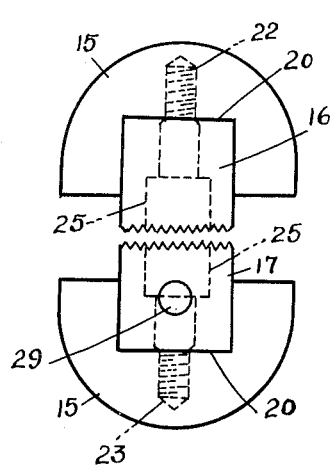
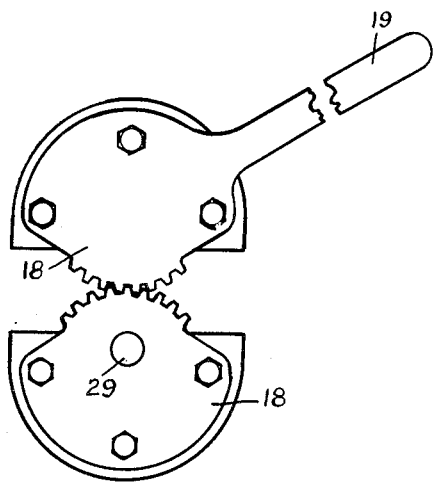
INVENTOR
ROBERT V. LACKNER
by Christy, Parmelee and
Strickland
his attorneys

United States Patent Office 2,716,688
Patented Aug. 30, 1955

2,716,688

SHEET LEVELING APPARATUS

Robert V. Lackner, Pittsburgh, Pa., assignor to Loftus Engineering Corporation, Pittsburgh, Pa., a corporation of Maryland Application June 2, 1953, Serial No. 359,101

2 Claims. (Cl. 219—1)

My invention relates to apparatus for treating metal sheets, and more particularly to apparatus for flattening or leveling such sheets under the effects of tension and heat.

In the case of sheets of certain metals, say sheets of titanium, the job has been difficult. It seems that titanium sheets must be stretched while at a temperature upwards of 700° F., and the difficulty in readily heating and stretching such sheets has in large measure been eliminated by the use of the apparatus and method disclosed in my copending United States patent application Serial No. 334,001, filed January 29, 1953.

The said apparatus comprises two heads or stands having jaws that engage the edges of a sheet at opposite ends, together with means for powerfully moving the heads away from one another, to subject the intervening body of the sheet to uniformly distributed tension. Means are provided in combination with the apparatus for passing electric current through the sheet, whereby the substance of the sheet is heated by the effect of its electrical resistance and the flowing current. Advantageously, if not essentially, the jaws that engage the sheet form the electrodes between which the heating current is caused to flow through the sheet, preparatory to and/or during the stretching operation. The jaw or jaws in one stretching head necessarily is electrically isolated from the jaws in the other head, in order to prevent an electrical short circuit and to promote an efficient flow of current through the sheet body. This insulation of the jaws or electrodes has presented a serious problem. In the apparatus of my copending application, Serial No. 334,001, the required electrical isolation is obtained by insulating the jaws in their mountings in the stretching heads. Due to the enormous pressures, to which the jaws are subjected in service, the unit pressures and stresses imposed upon the insulation are exceedingly high, resulting in a tendency for the insulation to fail mechanically. The installation cost and the cost of maintenance are relatively great.

My present invention is found in an effective solution of the stated problem.

In the drawings there is shown a preferred embodiment of the invention. In this showing:

Fig. 3 is a view to larger scale, showing in elevation a pair of gripping jaws incorporated in the apparatus of Fig. 1;

Fig. 4 is an end view of the gripping jaws, as seen from the left of Fig. 3; and Fig. 5 is an end view of said jaws, as seen from the right of Fig. 3.

Figure 1:
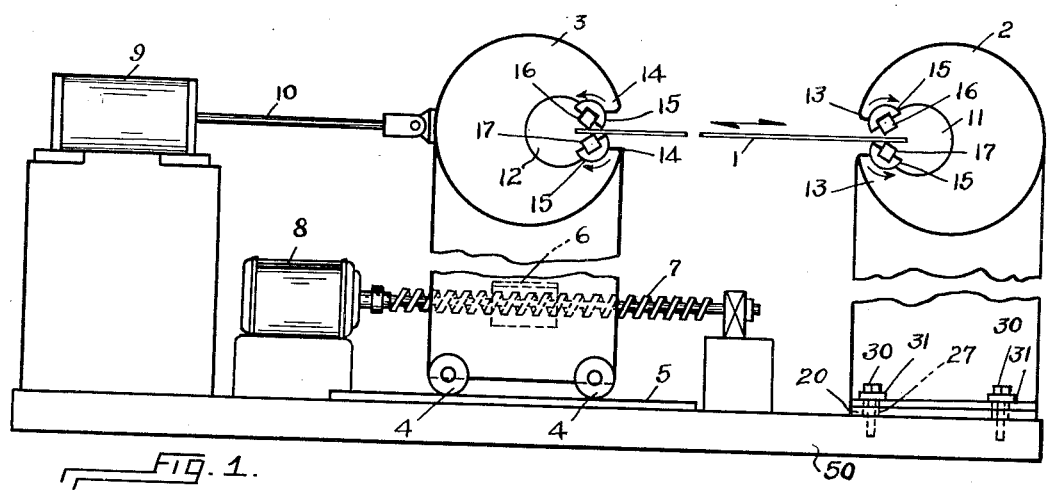
Fig. 1 is a diagrammatic elevational view of apparatus for electrically heating and stretching metal sheets.
Figure 2:
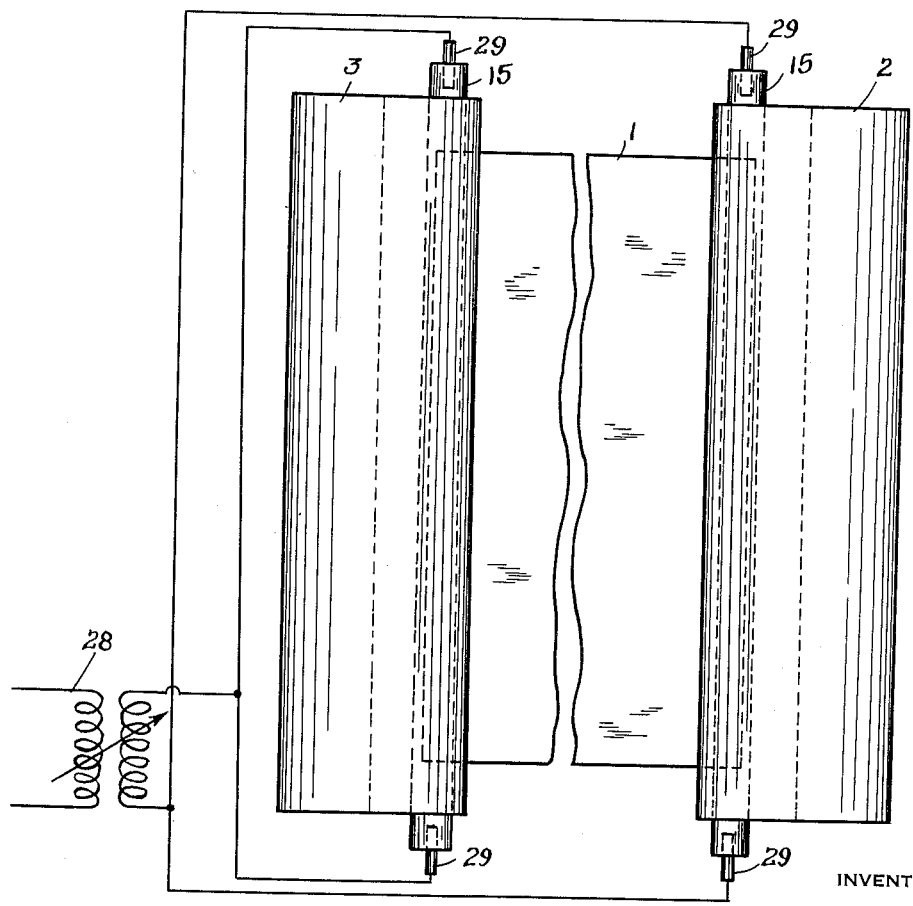
Fig. 2 is a plan view of a part of the apparatus shown in Fig. 1, illustrating schematically an electrical circuit for supplying heating current to the sheet.

In Figs. 1 and 2 of the drawings, the numeral 1 designates a metal sheet to be worked and stretched by the apparatus therein shown. In a manner presently to be described, the apparatus grips the two ends of the sheet and applies an endwise stretching force thereto for the purpose of working and straightening the sheet. Metal sheets worked in this manner usually have a length of from 60 to 144 inches, a width of from about 15 to 72 inches, and a thickness of from .015 to .060 of an inch. As has been indicated above, most metals, such as aluminum, stainless steel, magnesium, and the like, may be worked by this apparatus with the sheets at room temperature, but certain metals and alloys, such as titanium and its alloys, which are hard and tough at room temperature, are difficult to work.

The apparatus for stretching the sheet 1 comprises a stationary head 2, and a movable head 3, the latter head being mounted on rollers 4 for movement over a trackway 5 toward and away from the stationary head 2. The head 3 is provided with a split clutching nut 6 having engagement with a threaded shaft 7 operated by an electric motor 8 for initially positioning the head 3 with respect to the head 2, in accordance with the length of the sheet to be worked. The sheet-tensioning and working force is thereafter applied to the head 3 by an hydraulic motor 9 through a piston rod 10.

The heads 2 and 3 are provided with elongate, transversely extending openings 11, 12, providing pairs of vertically spaced supports 13, 13 and 14, 14. An elongate operating member 15 of semi-circular cross-section is rotatably mounted in each of the supports 13, 14. The operating members 15 are arranged in spaced vertical pairs in the stretching heads 2 and 3, and such members are slightly longer than the openings 11, 12, so that the ends of the members project from the standards or heads 2 and 3, as shown best in Fig. 2. Each of the operating members 15 has an elongate slot 20 extending over its entire length, in which slot a sheet-gripping jaw is mounted. The gripping jaws mounted in the operating members carried by the upper supports 13, 14 are designated by the numeral 16, while those mounted in the operating members carried by the lower supports 13, 14 are designated by the numeral 17.

Operation of the apparatus is effected by first actuating the nut 6 to position the head 3, so that the ends of the sheet 1 may be arranged between the gripping jaws 16 and 17, as shown in Fig. 1. The nut 6 is then disengaged from the shaft 7, and the vertically spaced pairs of operating members 15 are manually rotated in opposite directions, as indicated by the arrows in Fig. 1, to move the jaws 16 and 17 into initial gripping engagement with the ends of the sheet 1. To effect initial manual operation of the jaws 16 and 17 into gripping engagement, one end of each vertically spaced pair of operating members 15 is provided with intermeshing gear segments 18, 18, one of which has a manual operating lever 19, as shown in Figs. 3 and 5. After initial gripping engagement of the jaws 16 and 17 with the ends of the sheet 1 has been effected in this manner, hydraulic pressure is applied to the cylinder 9 to pull the head 3 away from the stationary head 2 and apply tension to the sheet 1. As the tension applied to the sheet 1 increases, the operating members 15 tend to rotate further in the direction indicated by the arrows in Fig. 1, and the more the applied tension increases the greater becomes the gripping force of the jaws 16 and 17 upon the ends of the sheet.

The structure and mounting of the upper jaws 16, 16 and of the lower jaws 17, 17 are substantially identical, and are illustrated by the showing of the single pair in Figs. 3, 4, and 5. The upper jaw 16 is formed of plural sections 16a, each of which is provided with a threaded fastener 22 for securing it in the slot 20 of its operating member 15. The formation of the upper jaws 16 in sections 16a minimizes warping and provides for a limited self-adjustment of their positions with respect to the jaws 17, to insure uniform gripping effect along the entire length of the engaged edges of the sheet.

The lower jaw 17 may be continuous and integral from end to end, so that it may serve as a current distributing electrode, as will presently appear. The lower jaw 17 is preferably secured in its slot 20 by at least three fastening members 23, only two of which are seen in the fragmentary showing of Fig. 3.

The fastening members 22 and 23 have threaded engagement with the operating members 15, and such fastening members have enlarged slotted screw heads 25 received in appropriately shaped openings in the clamping jaws.

As has been indicated above, the lower jaws 17 form electrodes, between which a distributed flow of heating current is effected through the intervening body of the sheet. The current for heating the sheet 1 is supplied by a transformer 28, which has its secondary circuit electrically connected to copper terminal plugs 29 mounted in suitable openings formed in the ends of the lower jaws 17. The transformer 28 is preferably a step-down transformer, and, as indicated, its output is variable, whereby a commercially available line potential of 110 or 220 volts may be reduced to a voltage suitable for heating the sheet 1. For most metals, such as titanium, and its alloys, an applied voltage of about 12 to 20 volts will be found satisfactory. While both ends of the electrode jaws 17 are shown as having a terminal plug 29 in Figs. 2 and 3, it is to be understood that this is only necessary in the case of the treating sheets having a maximum width and thickness, while for narrower and thinner sheets uniform distribution may be had by providing a connection (29) at only one end of each of the electrode jaws 17. In the event that extremely thick and wide sheets are to be treated, it will be understood further that the distributing plugs 29 may extend axially over the entire length of the electrode jaws 17, to insure uniform current distribution.

From the foregoing, it will be apparent that the clamping jaws 17 operate to supply both a heating current and stretching tension to the sheet. The current circulated through the sheet between the spaced-apart jaws 17 results in its temperature being raised to a point (500° to 700° F. in the case of titanium and its alloys) at which the metal will respond to the tension applied thereto. In this manner, the jaws 17 are effective to create in the article an electrical difference in potential between the spaced-apart lines of engagement, and such difference in potential results in a flow of electrical current through the substance of the sheet, whereby the electrical resistance of the sheet body in conjunction with the flowing current generates heat and raises the temperature of the sheet to the desired value. The amount of heating is of course dependent upon the resistance of the metal, the voltage, and the time in which the current is circulated. The stretching stress is preferably applied to the sheet simultaneously with the heating current.

In the structure of my said copending application the jaw members 16 and 17 are insulated from the operating members 15, and from the heads 2 and 3 in which the members 15 are mounted. The great stress reacting upon the jaws in service, presents a problem; that is, it is difficult to provide a jaw-insulating material which is enduring under the high unit pressures to which the insulating material is subjected. In accordance with my present invention, I eliminate or avoid insulating of the current-carrying jaws as such. Advantageously, the entire head structure 2 is insulated from the head structure 3. Specifically, the rollers 4 may be constructed of insulating material, such as compressed fibreboard impregnated and integrated with urea formaldehyde. Also, the nut 6, which is not subject to great stress, is formed of a like material, whereby the entire structure of the head or stand 3 is insulated both from the trackway 5 and base 50, on which the head 3 is mounted, and thus is insulated from the head or stand 2.

Alternatively, and preferably, the stationary head 2 is mounted on a fixed insulating pad 20 interposed between the body of the head and the base or foundation 50 of the apparatus. Insulating sleeves 27 are provided around bolts 30 that anchor the head 2 to the base. Washers 31 of insulating material may also be used with the bolts, to insure absolute electrical isolation of the stationary head 2 from the base 50 and from the associated head 3. The relatively great expanse or area of the insulating pad 20 insures that the unit pressures and stresses to which the insulating material is subject in service are well within limits essential for normal insulation life. By employing relatively low voltages in the sheet leveling apparatus, as described, the particularly effective structural organization described may be enjoyed without danger to the operators of the apparatus.

While I have illustrated and described a preferred embodiment of my invention, it will be understood that this is merely by way of illustration, and that various changes and modifications may be made within the contemplation of the invention as defined in the following claims.

I claim:

1. In an apparatus for working metal sheets comprising a pair of heads mounted for movement relative to each other to stretch a metal sheet positioned therebetween and respectively provided with a pair of spaced and elongate operating members mounted for rotation about spaced parallel axes, the invention herein described wherein each of said operating members is provided with a jaw comprising an electrode for gripping engagement with an edge of a sheet to be stretched by said heads, said electrode being in electrical communication with its associated operating member and head, means for electrically insulating one head from the other, and an electrical circuit having terminal connections with said electrodes for circulating a heating current through a sheet engaged by said jaws.

2. In an apparatus for working metal sheets comprising a pair of heads, a base for rigidly supporting one head and mounting the other head for movement relatively to the first head, a pair of spaced operating members mounted in each head, a jaw comprising an electrode in each operating member for gripping engagement with an edge of a sheet to be stretched, said jaws and operating members being in electrical communication severally with their associated heads, means for electrically isolating the said fixed head from said base and from said movable head, an electrical circuit having terminal connections with said electrode jaws for passing a heating current through an engaged sheet, and means for powerfully moving said heads apart for imposing tension on the engaged sheet and stretching it under the heating effect of current passing through the sheet.

References Cited in the file of this patent

UNITED STATES PATENTS

| 1,654,563 | Taylor | Jan. 3, 1928 |
| 2,314,656 | Morton | Mar. 23, 1943 |